United States Patent
Brubaker et al.

(10) Patent No.: US 10,554,899 B2
(45) Date of Patent: Feb. 4, 2020

(54) HDR IMAGING

(71) Applicant: Goodrich Corporation, Charlotte, NC (US)

(72) Inventors: Robert Brubaker, Freehold, NJ (US); Gavin Dyer, Hollis, NH (US); Davis A. Lange, Charlotte, NC (US)

(73) Assignee: Goodrich Corporation, Charlotte, NC (US)

( * ) Notice: Subject to any disclaimer, the term of this patent is extended or adjusted under 35 U.S.C. 154(b) by 141 days.

(21) Appl. No.: 15/381,371

(22) Filed: Dec. 16, 2016

(65) Prior Publication Data

US 2018/0176438 A1  Jun. 21, 2018

(51) Int. Cl.
  *H04N 5/235* (2006.01)
  *H04N 5/445* (2011.01)
  *G06T 3/40* (2006.01)

(52) U.S. Cl.
  CPC .......... *H04N 5/2352* (2013.01); *G06T 3/40* (2013.01); *H04N 5/44504* (2013.01)

(58) Field of Classification Search
  CPC ........ H04N 5/243; H04N 5/353; H04N 5/355; H04N 5/2353; H04N 5/2352; H04N 5/2355; H04N 5/235
  See application file for complete search history.

(56) References Cited

U.S. PATENT DOCUMENTS

| | | |
|---|---|---|
| 5,101,108 A | 3/1992 | Gaalema et al. |
| 7,825,966 B2 | 11/2010 | Manabe et al. |
| 8,576,292 B2 | 11/2013 | Wright et al. |
| 8,599,284 B2 | 12/2013 | Mo et al. |
| 8,780,418 B1 | 7/2014 | Bluzer et al. |
| 9,040,892 B2 | 5/2015 | Smith |
| 9,270,895 B2 | 2/2016 | Kelly et al. |
| 9,307,161 B2 | 4/2016 | Lee et al. |
| 9,319,605 B2 | 4/2016 | Shen et al. |

(Continued)

FOREIGN PATENT DOCUMENTS

| | | |
|---|---|---|
| CN | 105872398 A | 8/2016 |
| WO | WO-2009/026522 A1 | 2/2009 |

OTHER PUBLICATIONS

Xue Xu-Cheng et al., "Increasing dynamic range of space pushbroom remote sensing camera by two-row TDI CCD", Guangxue Jingmi Gongcheng—Optics and Precision Engineering, Zhongguo Kexueyuan Changchun Jingmi Jixie Yanjiusuo, Changchin, CN, vol. 20, No. 12, Nov. 30, 2012, pp. 2791-2795, retrieved from the Internet: URL:http://www.opticsjournal.net/Abstract, retrieved Mar. 22, 2018.

(Continued)

*Primary Examiner* — Kelly L Jerabek
(74) *Attorney, Agent, or Firm* — Locke Lord LLP; Scott D. Wofsy; Joshua L. Jones

(57) ABSTRACT

The present disclosure generally relates to HDR imaging techniques, and more specifically to HDR imaging techniques for use when a scene is moving. For time delay integration, the same scene location is repeatedly imaged on sequential rows, allowing for different gain values and/or exposure times to be utilized in different rows. The present disclosure utilizes a static or dynamic selection of gain values and/or exposure times on each row to enable stitching of the rows for high dynamic range.

18 Claims, 2 Drawing Sheets

(56) References Cited

U.S. PATENT DOCUMENTS

| | | | | |
|---|---|---|---|---|
| 2011/0115897 | A1* | 5/2011 | Najmabadi | G01N 21/6458 |
| | | | | 348/79 |
| 2014/0078365 | A1* | 3/2014 | Cho | H04N 5/35554 |
| | | | | 348/302 |
| 2014/0176731 | A1* | 6/2014 | Geiss | H04N 5/2355 |
| | | | | 348/207.1 |
| 2015/0054973 | A1* | 2/2015 | Velichko | H04N 5/369 |
| | | | | 348/218.1 |
| 2015/0055002 | A1* | 2/2015 | Beck | H04N 5/3559 |
| | | | | 348/308 |
| 2015/0085145 | A1* | 3/2015 | Sinha | H04N 5/23222 |
| | | | | 348/207.1 |
| 2015/0312493 | A1* | 10/2015 | Aldridge | H04N 5/04 |
| | | | | 348/157 |
| 2016/0316163 | A1* | 10/2016 | Beck | H04N 5/3559 |
| 2017/0230596 | A1* | 8/2017 | Colonero | H04N 5/23254 |

OTHER PUBLICATIONS

Cao Qilei et al., "The UAV verification experiment of on-orbit dynamic scene matching", 2017 IEEE 2nd Advanced Information Technology, Electronic and Automation Control Conference (IAEAC), IEEE, Mar. 25, 2017, pp. 841-845.

Extended European Search report dated Apr. 11, 2018, issued during the prosecution of European Patent Application No. EP 17207803.2 (11 pages).

\* cited by examiner

HDR IMAGING

BACKGROUND OF THE INVENTION

1. Field of the Invention

The present disclosure relates to imaging technology, and more particularly to High Dynamic Range (HDR) imaging.

2. Description of Related Art

General imaging problems exists in obtaining adequate signal-to-noise ratios over a large range of scene irradiance. Typically, there is a tradeoff between achieving improved detector sensitivity with low signal and avoiding detector saturation with high signal. Automatic gain control algorithms are typically utilized to select the tradeoff. Solutions to improve the tradeoff include the utilization of a high dynamic range (HDR) technique, which stitches together sequential scene acquisitions at different exposure times or gains. The conventional techniques have been considered satisfactory for their intended purpose; however, these HDR techniques are difficult to implement and use when the scene is moving as the scene shifts between sequential acquisitions.

As such, there is an ever present need for an improved system and method for HDR imaging. This disclosure provides a solution for this problem.

SUMMARY OF THE INVENTION

The disclosure generally relates to HDR imaging techniques, and more specifically to HDR imaging techniques for use when a scene is moving. In one embodiment, a method of obtaining an image having a high dynamic range is disclosed. The method includes scanning with a time-delay integration (TDI) sensor to obtain image data from a first plurality of pixel rows and a second plurality of pixel rows. The first plurality of pixel rows has a first gain value and/or a first exposure time setting. The second plurality of pixel rows has a second gain value and/or a second exposure time setting. The method further includes combining image data from the first plurality of pixel rows using TDI to produce a first image and combining image data from the second plurality of pixel rows using TDI to produce a second image. The method also includes combining the first image and the second image to obtain a third image having a high dynamic range compared to the first image and the second image. The first and second images can be obtained in a single scan of the sensor. Setting the first and second gain values and/or the first and second exposure times is done via software and/or hardware.

In another embodiment, a system for image capture is disclosed. The system includes a TDI sensor having a plurality of pixel rows and a controller operatively connected to the TDI sensor. The plurality of pixel rows include a first set of pixel rows with a first gain value and/or exposure time setting and a second set of pixel rows with a second gain value and/or exposure time setting. The controller includes a processor and a memory, wherein the memory stores instructions that, when executed by the processor, cause the system to obtain image data from the plurality of pixel rows and combine the image data to obtain an image having a high dynamic range. In certain embodiments, the controller may be configured to independently adjust the gain value settings and/or an exposure time for each of the plurality of pixel rows. In certain embodiments, each of the plurality of pixel rows has a single gain value and/or exposure time. In other embodiments, each of the plurality of pixel rows is addressable by the controller to select a variable gain value and/or exposure time. In some embodiments, the controller is configured to select a gain value and/or exposure time for each of the plurality of pixel rows automatically between each image acquisition within an entire image acquisition sequence. In certain embodiments, a first plurality of pixel rows within an image is controllable to select a gain value and/or exposure time for each subsequent plurality of pixel rows within the image, and/or the first plurality of pixel rows is disposed at the beginning of the image with respect to a scanning direction.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

Figure 1:
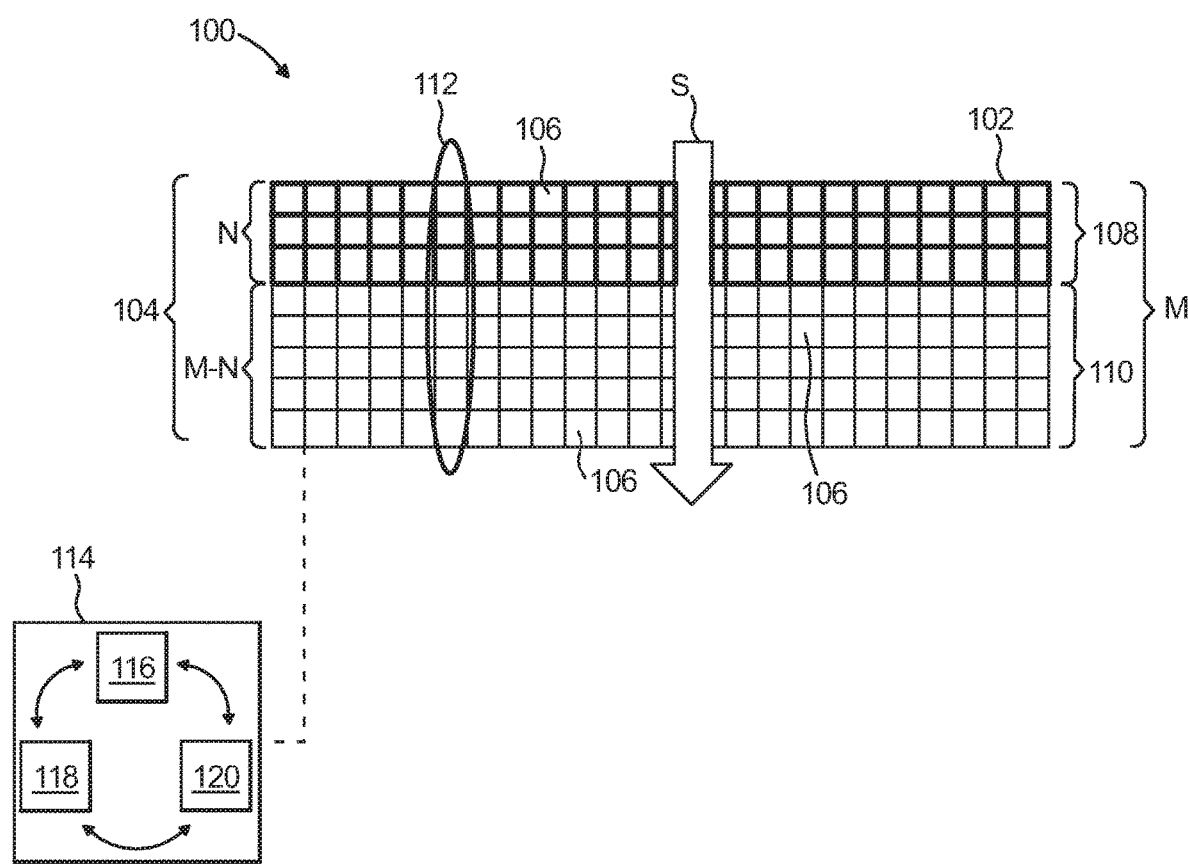
FIG. 1 is a schematic view of a system for image capture, constructed in accordance with an exemplary embodiment of the present disclosure, showing the pixel rows with two different levels of gain and/or exposure time.

To facilitate understanding, identical reference numerals have been used, wherein possible, to designate identical elements that are common to the figures. It is contemplated that elements and features of one embodiment may be beneficially incorporated in other embodiments without further recitation.

DETAILED DESCRIPTION OF THE PREFERRED EMBODIMENTS

Reference will now be made to the drawings wherein like reference numerals identify similar structural features or aspects of the subject disclosure. For purposes of explanation and illustration, and not limitation, a schematic view of an exemplary embodiment of a system for image capture, in accordance with the disclosure, is shown in FIG. 1 and is designated generally by reference character 100. Other embodiments of systems, in accordance with the disclosure, or aspects thereof, are provided in FIG. 2, as will be described. The disclosure of the systems and methods herein generally relate to HDR imaging techniques, and more specifically to HDR imaging techniques for use when a scene is moving. For time delay integration, the same location is repeatedly imaged on sequential pixel rows, allowing for different gain values and/or exposure time settings to be utilized on different pixel rows. The present disclosure utilizes a static or dynamic selection of gain values and/or exposure time settings on each pixel row to enable stitching of the rows for high dynamic range.

The system 100 includes a TDI sensor 102 for scanning an image in at least one scan direction, as shown by reference arrow S. The TDI sensor 102 includes a plurality of pixel rows 104. Each pixel row 104 includes at least one pixel detector 106 disposed therein. The TDI sensor 102 may include M number of pixel rows in the plurality of pixel rows 104. As shown in FIG. 1, and by way of example only, the TDI sensor 102 includes eight pixel rows 104 (e.g., in FIG. 1, M=8). It is contemplated, however, that any number of pixel rows 104 may be included in the TDI sensor 102. As further shown, the plurality of pixel rows may 104 be divided into a first subplurality of pixel rows 108 and a second sub-plurality of pixel rows 110. The first subplurality of pixel rows 108 includes N pixel rows, and the second subplurality of pixel rows 110 includes M–N pixel rows (e.g., in FIG. 1, N=3 and M–N=5). In certain embodiments, the pixels in the first subplurality of pixel rows 108 may have a low gain value (K1) and/or short exposure time (t1), while the pixels in the second subplurality of pixel rows may have a high gain value (K2) and/or long exposure time (t2), or vice versa. The system 100 gain value for detector 106 is K in units of DN/e. Furthermore, each column 112 of the TDI sensor 102 may be used to form at least one pixel in an image during operation.

The system 100 further includes a controller 114 operatively connected to the TDI sensor 102. The controller 114 includes at least a central processing unit (CPU) 116 and a memory 118. The memory 118 is configured to store instructions that, when executed by the processor 116, cause the system 100 to obtain image data from the plurality of pixel rows 104, and combine the image data to obtain an image having a high dynamic range. The controller 114 also includes support circuits (or I/O) 120. The CPU 116 may be one of any form of computer processors that are used in industrial settings for controlling various processes and hardware (e.g., motors or other hardware) and monitor the processes (e.g., exposure time, position, and location). The memory 118 is connected to the CPU 116, and may be one or more of a readily available memory, such as random access memory (RAM), read only memory (ROM), floppy disk, hard disk, or any other form of digital storage, local or remote. Software instructions and data can be coded and stored within the memory for instructing CPU 116. The support circuits 120 are also connected to the CPU 116 for supporting the processor in a conventional manner. The support circuits 120 may include conventional cache, power supplies, clock circuits, input/output circuitry, subsystems, and the like. A program (or computer instructions) readable by the controller 114 implements the method described herein (infra) and/or determines which tasks are performable. The program may be software readable by the controller 114 and may include code to monitor and control, for example, gain values, exposure times, etc. In certain embodiments, the controller 114 may be a PC microcontroller. The controller 114 may also automate the sequence of the process performed, and/or the modes performed, by the system for image capture.

Each pixel of the pixel row 104 has at least two different gain value settings and/or exposure time settings. Setting the first and second gain values and/or the first and second exposure times is done via software and/or hardware. In some embodiments, the controller 114 is configured to independently adjust the gain value settings and/or an exposure time for each pixel of the plurality of pixel rows 104. In various embodiments, the controller 114 may operate to control each pixel of the plurality of pixel rows 104 in various modes, described infra.

In a first exemplary mode, the each of the plurality of pixel rows 104 is "hard-wired" to only have one gain value and/or exposure time. In some embodiments, "hard-wired" may include that each of the plurality of pixel rows 104 is fixed to have only one gain value and/or exposure time setting. In other embodiments, "hard wired" may include that each of the plurality of pixel rows 104 is physically wired or connected (e.g., via a wireless connection) to a controller, wherein the controller controls each of the plurality of pixel rows such that each only has one gain value and/or exposure time setting. The first mode may allow each pixel to perform at peak performance at each gain value and/or exposure time. By way of example only, the first sub-plurality of pixel rows 108 may have a low gain value and/or short exposure time, and the second sub-plurality of pixel rows 110 may have a high gain value and/or long exposure time. As such, the output of the pixel row gains is fixed.

In a second exemplary mode, each of the plurality of pixel rows 104 is addressable by the controller 114 to select a variable gain value and/or exposure time. As such, the number of pixel rows for each gain value and/or exposure time is fixed, based on calculation, for an entire image acquisition sequence. The time to change the number of pixel rows can be on the order of milliseconds to seconds. As such, a gain value and/or exposure time is selected and not altered during obtainment of the image sequence.

In a third exemplary mode, the controller 114 is configured to select a gain value and/or an exposure time for each of the plurality of pixel rows 104 automatically between each image acquisition within or during an image acquisition sequence. Selection of the gain value and/or exposure time is via an automatic gain control and/or exposure time algorithm to select the number of pixel rows for each gain or exposure time between individual image acquisitions within the entire image acquisition sequence. The time to change the number of pixel rows can be on the order of many microseconds. As such, the image sequence is optimized from one image to the next in the sequence.

In a fourth exemplary mode, the first sub-plurality of pixel rows 108 within the image is controllable by the controller 114 to select a gain value and/or exposure time for each subsequent plurality of pixel rows (e.g., the second sub-plurality of pixel rows 110, etc.) within the image acquisition. The first sub-plurality of pixel rows 114 is disposed at the beginning of the image acquisition with respect to a scanning direction. Furthermore, in some embodiments, the first sub-plurality of pixel rows 114 has a low gain value and/or short exposure time. As such, one or more rows are used at the beginning of the image acquisition, with respect to a scanning direction, to select the number of rows for each gain value and/or exposure time later within the same image acquisition. As such, the first row is processed and a command is issued to a read-out integrated circuit (ROIC) on the order of a few microseconds. It can be advantageous for a low gain value and/or short exposure time to be used for the first pixel row to reduce the number of saturated detectors 106. If there are more than two gain values and/or exposure times, a row for each gain value and/or exposure time is provided at the beginning of the image acquisition, with respect to the scanning direction.

Figure 2:
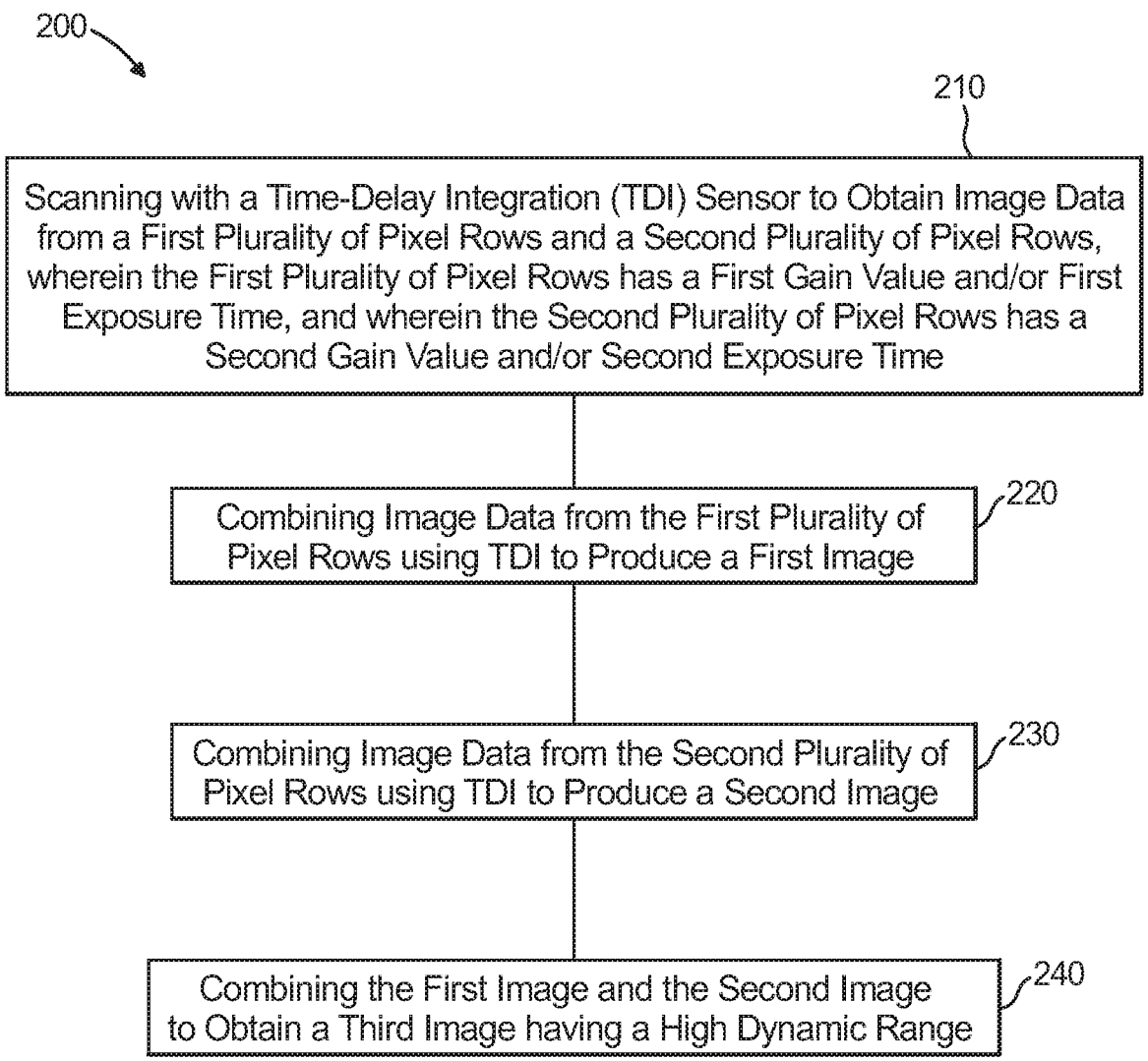
FIG. 2 illustrates a schematic flow diagram of a method of obtaining an image having a high dynamic range, in accordance with an exemplary embodiment of the present disclosure.

FIG. 2 illustrates a schematic flow diagram of a method 200 of obtaining an image having a high dynamic range (HDR). At operation 210, a time-delay integration (TDI) sensor scans a first plurality of pixel rows and a second plurality of pixel rows to obtain image data from each of the first plurality of pixel rows and the second plurality of pixel rows. The first plurality of pixel rows has a first gain value and/or first exposure time and the second plurality of pixel rows has a second gain value and/or second exposure time.

At operation 220, image data from the first plurality of pixel rows is combined using TDI to produce a first image. As such, multiple exposures of the same object may be accumulated. In some embodiments, the object may be moving or static. At operation 230, image data from the second plurality of pixel rows is combined using TDI to produce a second image.

At operation 240, the first image and the second image are combined to obtain a third image. The third image has a high dynamic range relative to the first image and the second image individually. The combining of the first image and the second image includes scaling the image data of the first plurality of pixel rows and the image data of the second plurality of pixel rows such that the image data of the first plurality of pixel rows and the image data of the second plurality of pixel rows have the same input referred units. The combining of the first image and the second image also includes stitching the image data of the first plurality of pixel rows and the image data of the second plurality of pixel rows by signal level. The first and second images are obtained in a single scan of the sensor as opposed to two sequential scans.

In some embodiments, the method 200 may also include setting a first gain value and/or a first exposure time for the first plurality of pixel rows of the TDI sensor, and setting a second gain value and/or second exposure time for the second plurality of pixel rows of the TDI sensor. The first gain value and/or the first exposure time is different that the second gain value and/or second exposure time.

As described supra, in certain embodiments, each of the plurality of pixel rows may be operated in various modes. In a first embodiment of the method 200, each pixel row of the first plurality of pixel rows and the second plurality of pixel rows has a single fixed gain value and/or exposure time. As such, each pixel row is "hard wired" to only have one gain value and/or exposure time. As such, each pixel maintains high performance at each gain value and/or each exposure time. By way of example only, half of the pixel rows may have a low gain value and/or exposure time and half of the pixel rows may have a high gain value and/or exposure time.

In a second embodiment of the method 200, each pixel row of the first plurality of pixel rows and the second plurality of pixel rows is individually addressable to select a variable gain value and/or exposure time. In certain embodiments, the variable gain value and/or exposure time is fixed for each pixel row of the first plurality of pixel rows and the second plurality of pixel rows for at least one image acquisition. In certain embodiments, the variable gain value and/or exposure time is held constant for each pixel row of the first plurality of pixel rows and the second plurality of pixel rows while obtaining all image data for an image sequence.

In a third embodiment of the method 200, the method 200 further includes determining the first gain and a first number of pixel rows within the first plurality of pixel rows and the second gain a second number of pixel rows within the second plurality of pixel rows between each of a plurality of image acquisitions within an image acquisition sequence. This cycle repeats for each image. This mode enables optimization of the dynamic range of each image based on the information from previous images, which is useful when the scene irradiance distribution does not change by a large step between images, but is more adaptive than the previous static embodiment. The timing demands are moderate given that the time constant is on the order of the number of TDI row readout times.

In a fourth embodiment of the method 200, the first plurality of pixel rows selects the second gain value and/or exposure time for the second plurality of pixel rows. As such, one or more pixel rows at the beginning of the image is utilized to select the number of pixel rows for each gain value and/or exposure time later within the same image acquisition. In certain embodiments, a low gain value and/or exposure time is utilized for the first pixel row to minimize the number of saturated detectors. This repeats for each image. This mode enables optimization of the dynamic range of each image based on the information within that same image by using the initial TDI rows. This is most useful when the scene irradiance distribution is changing substantially between images, so that the information from earlier images is less useful. The timing demands are the most challenging because the change of the gain or exposure time of most of the rows must be effective on the order of one TDI row readout time after the first TDI row is read.

The methods and systems of the present disclosure, as described above and shown in the drawings, can provide for improved HDR imaging with benefits including that existing CMOS time delay integration image sensors use fixed gain values and exposure times. As such, the present disclosure can allow for the HDR technique to extend the acquisition over a wider range of irradiance than the fixed settings, and further allows dynamic selection of the settings between or within individual image acquisitions. Additional benefits can include that the present disclosure reduces overall system costs, improves speed, requires less light, and is applicable to airborne applications as well as to any machine vision applications. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method of obtaining an image having a high dynamic range (HDR), comprising:
    scanning a scene in a scan direction with a sensor to obtain image data as an image acquisition from a first plurality of pixel rows and a second plurality of pixel rows, wherein the first plurality of pixel rows has a first gain value and/or first exposure time, and wherein the second plurality of pixel rows has a second gain value and/or second exposure time;
    combining image data from the first plurality of pixel rows to produce a first image;
    combining image data from the second plurality of pixel rows to produce a second image;
    combining the first image and the second image to obtain a third image having a high dynamic range, wherein scanning with a sensor includes repeatedly scanning with the sensor to obtain image data for a plurality of image acquisitions; and
    determining the first gain value and/or exposure time and a first number of pixel rows within the first plurality of pixel rows and the second gain value and/or exposure time and a second number of pixel rows within the second plurality of pixel rows between each image acquisition of the plurality of image acquisitions.

2. The method of claim 1, further comprising:
    setting the first gain value and/or the first exposure time for the first plurality of pixel rows of the sensor; and
    setting the second gain value and/or the second exposure time for the second plurality of pixel rows of the sensor.

3. The method of claim 2, wherein setting the first and second gain values and/or the first and second exposure times is done via software.

4. The method of claim 2, wherein setting the first and second gain values and/or the first and second exposure times is done via hardware.

5. The method of claim 1, wherein combining the first image and the second image further comprises:
scaling the image data of the first plurality of pixel rows and the image data of the second plurality of pixel rows such that the first data and the second data have the same input referred units.

6. The method of claim 1, wherein the combining the first image and the second image further comprises:
stitching the image data of the first plurality of pixel rows and the image data of the second plurality of pixel rows by signal level.

7. The method of claim 1, wherein the first gain value and/or the first exposure time is different than the second gain value and/or the second exposure time.

8. The method of claim 7, wherein the variable gain value and/or exposure time is fixed for each pixel row of the first plurality of pixel rows and the second plurality of pixel rows for at least one image acquisition, and wherein the variable gain value and/or exposure time is held constant for each pixel row of the first plurality of pixel rows and the second plurality of pixel rows while obtaining all image data for an image.

9. The method of claim 1, wherein each pixel row of the first plurality of pixel rows and the second plurality of pixel rows is individually addressable to select a variable gain value and/or exposure time.

10. The method of claim 1, wherein the first plurality of pixel rows selects the second gain value and/or second exposure time for the second plurality of pixel rows.

11. The method of claim 1, wherein the first and second images are obtained in a single scan of the sensor.

12. A system for image capture, comprising:
a sensor having a first plurality of pixel rows and a second plurality of pixel rows, wherein each pixel row has at least two different gain value or exposure time settings; and
a controller operatively connected to the sensor, comprising:
a processor; and
a memory storing instructions that, when executed by the processor, cause the system to:
obtain image data from the plurality of pixel rows as an image acquisition;
combine image data from the first plurality of pixel rows to produce a first image;
combine image data from the second plurality of pixel rows to produce a second image;
combine the first image and the second image to obtain a third image having a high dynamic range; and
determine the first gain value and/or exposure time and a first number of pixel rows within the first plurality of pixel rows and the second gain value and/or exposure time and a second number of pixel rows within the second plurality of pixel rows between each image acquisition of the plurality of image acquisitions,
wherein the controller is configured to obtain image data by scanning a scene in a scan direction for a plurality of image acquisitions and to select a gain value and/or exposure time for each of the plurality of pixel rows automatically between each image acquisition of the plurality of image acquisitions, wherein scanning with a sensor includes repeatedly scanning with the sensor to obtain image data for a plurality of image acquisitions.

13. The system of claim 12, wherein the controller is configured to independently adjust the gain value settings and/or an exposure time for each of the plurality of pixel rows.

14. The system of claim 12, wherein each of the plurality of pixel rows is addressable by the controller to select a variable gain value and/or exposure time.

15. A system for image capture, comprising:
a sensor having a plurality of pixel rows, wherein each pixel row has at least two different gain value or exposure time settings; and
a controller operatively connected to the sensor, comprising:
a processor; and
a memory storing instructions that, when executed by the processor, cause the system to:
obtain image data from the plurality of pixel rows as an image acquisition by scanning a scene in a scan direction; and
combine the image data to obtain an image having a high dynamic range, wherein a first plurality of pixel rows within an image acquisition is controllable to select a gain value and/or exposure time for each subsequent plurality of pixel rows within the image acquisition.

16. The system of claim 15, wherein the first plurality of pixel rows is disposed at the beginning of the image acquisition with respect to the scan direction.

17. The system of claim 16, wherein the first plurality of pixel rows has a low gain value.

18. A system for image capture, comprising:
a sensor having a first plurality of pixel rows and a second plurality of pixel rows; and
a controller operatively connected to the sensor, comprising:
a processor; and
a memory storing instructions that, when executed by the processor, cause the system to:
obtain image data from the plurality of pixel rows as an image acquisition by scanning a scene in a scan direction; and
combine image data from the first plurality of pixel rows to produce a first image;
combine image data from the second plurality of pixel rows to produce a second image;
combine the first image and the second image to obtain a third image having a high dynamic range; and
determine the first gain value and/or exposure time and a first number of pixel rows within the first plurality of pixel rows and the second gain value and/or exposure time and a second number of pixel rows within the second plurality of pixel rows between each image acquisition of the plurality of image acquisitions,
wherein a first plurality of the pixel rows is disposed adjacent to one another at the beginning of the image acquisition with respect to the scan direction and a second plurality of the pixel rows is disposed adjacent to one another after the first plurality of the pixel rows with respect to the scanning direction, and wherein each of the plurality of pixel rows has a single gain value and/or exposure time, wherein scanning with a sensor includes repeatedly scanning with the sensor to obtain image data for a plurality of image acquisitions.

\* \* \* \* \*